United States Patent
Aulich et al.

(10) Patent No.: US 8,647,054 B2
(45) Date of Patent: Feb. 11, 2014

(54) AXIAL TURBO ENGINE WITH LOW GAP LOSSES

(75) Inventors: Marcel Aulich, Köln (DE); Christian Cornelius, Sprockhövel (DE); Georg Kröger, Köln (DE)

(73) Assignee: Siemens Aktiengesellschaft, Munich (DE)

( * ) Notice: Subject to any disclaimer, the term of this patent is extended or adjusted under 35 U.S.C. 154(b) by 514 days.

(21) Appl. No.: 13/054,190

(22) PCT Filed: Jul. 8, 2009

(86) PCT No.: PCT/EP2009/058681
§ 371 (c)(1),
(2), (4) Date: Apr. 5, 2011

(87) PCT Pub. No.: WO2010/006975
PCT Pub. Date: Jan. 21, 2010

(65) Prior Publication Data
US 2011/0189020 A1    Aug. 4, 2011

(30) Foreign Application Priority Data
Jul. 17, 2008 (EP) .................................... 08012959

(51) Int. Cl.
*F01D 5/20* (2006.01)
(52) U.S. Cl.
USPC ......... 415/119; 415/181; 415/173.1; 415/220
(58) Field of Classification Search
USPC ........ 415/119, 181, 170.1, 171.1, 173.1, 220, 415/914
See application file for complete search history.

(56) References Cited

U.S. PATENT DOCUMENTS

| | | | | |
|---|---|---|---|---|
| 2,846,137 A | * | 8/1958 | Smith, Jr. | ....................... 415/194 |
| 4,738,586 A | | 4/1988 | Harter | |
| 5,137,419 A | * | 8/1992 | Waterman | ................... 415/170.1 |
| 5,275,531 A | | 1/1994 | Roberts | |
| 5,513,952 A | * | 5/1996 | Mizuta et al. | ............... 415/182.1 |
| 5,639,095 A | | 6/1997 | Rhode | |
| 6,338,609 B1 | * | 1/2002 | Decker et al. | ............... 415/173.1 |
| 7,004,722 B2 | * | 2/2006 | Teramura et al. | ............. 415/119 |
| 2004/0028526 A1 | | 2/2004 | Hoshino et al. | |

FOREIGN PATENT DOCUMENTS

| | | |
|---|---|---|
| CN | 101153545 A | 4/2008 |
| EP | 0292250 A1 | 11/1988 |
| EP | 0675290 A2 | 10/1995 |
| EP | 1531233 A2 | 5/2005 |
| FR | 996967 A | 12/1951 |
| RU | 2457336 C1 | 7/2012 |
| SU | 358524 A1 | 1/1973 |

* cited by examiner

*Primary Examiner* — Igor Kershteyn

(57) ABSTRACT

An axial turbomachine including a rotor blade cascade is provided. The rotor blade cascade includes rotor blades each including front edge, a radially outer free blade tip and an annular enclosure enclosing the rotor blade cascade with an annulus inner side by means of which the annular enclosure is arranged directly adjacent to the blade tips to give a radial gap between the enveloping ends of the blade tips and the annulus inner side. The rotor blades include a radial projection in the region of the front edge on the blade tip and the annular enclosure has an annular radial recess in the annulus inner side, arranged at a radial distance from the ends of the blade tips, such that in the main flow direction of the axial turbomachine the line of the radial projections on the side facing the radial gap matches the line of the radial recess.

15 Claims, 2 Drawing Sheets

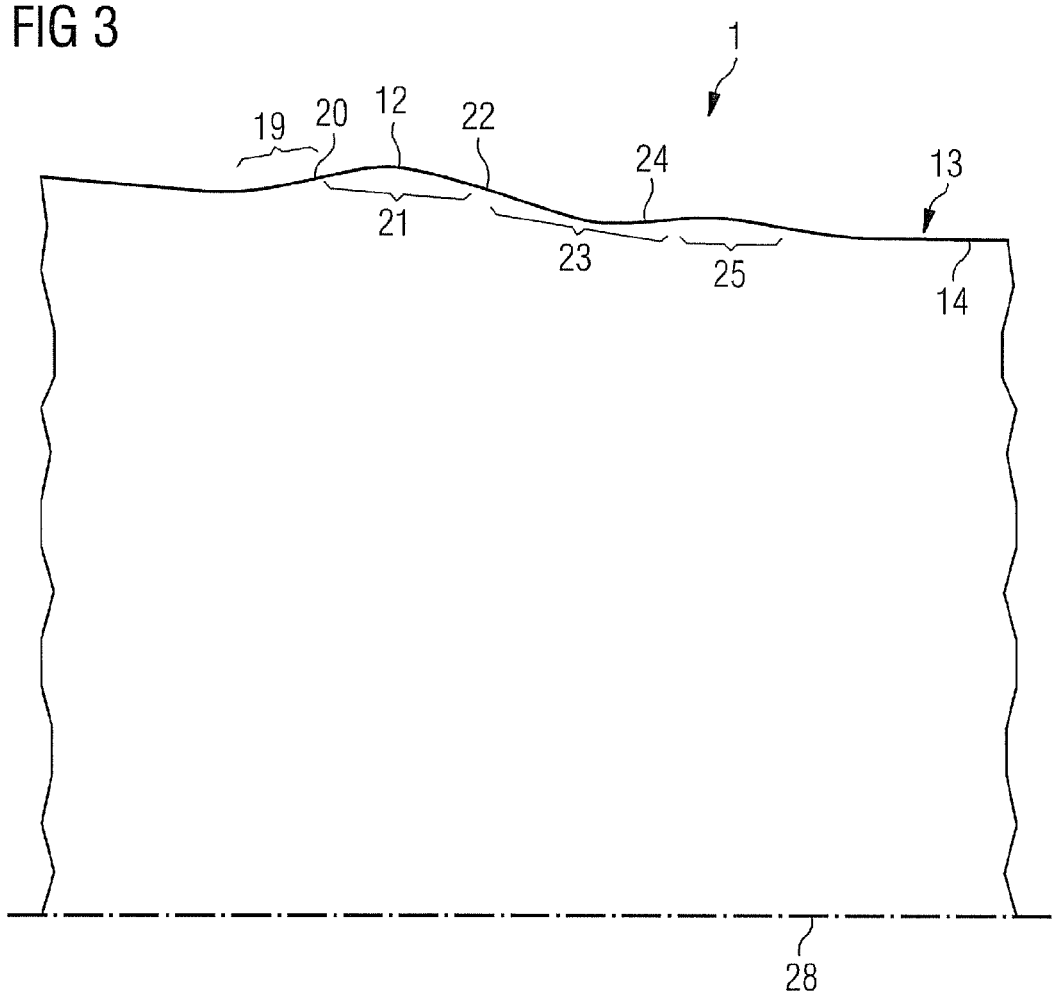

AXIAL TURBO ENGINE WITH LOW GAP LOSSES

CROSS REFERENCE TO RELATED APPLICATIONS

This application is the US National Stage of International Application No. PCT/EP2009/058681, filed Jul. 8, 2009 and claims the benefit thereof. The International Application claims the benefits of European Patent Office application No. 08012959.6 EP filed Jul. 17, 2008. All of the applications are incorporated by reference herein in their entirety.

FIELD OF INVENTION

The invention refers to an axial turbomachine which has low tip clearance losses.

BACKGROUND OF INVENTION

An axial turbomachine has a casing and a rotor which is enclosed by the casing. The rotor has a hub contour which together with the inner contour of the casing forms a flow passage through the axial turbomachine. The rotor has a multiplicity of rotor stages which are formed in each case by a rotor blade cascade. The rotor blade cascades have a multiplicity of rotor blades which by one of their ends are fastened in each case on the rotor on the hub side and by their other end point radially outwards. A blade tip, which faces the inner side of the casing and is arranged directly adjacent thereto, is formed at this other end of the rotor blade. The distance between each blade tip and the inner side of the casing is formed as a radial gap which is dimensioned in such a way that on the one hand the blade tips do not rub against the casing during operation of the axial turbomachine and on the other hand the leakage flow through the radial gap, which ensues during operation of the axial turbomachine, is as low as possible. So that the axial turbomachine has high efficiency, it is desirable that the leakage flow through the radial gap is as low as possible.

If the axial turbomachine is installed in an aero engine, the casing is of a filigree construction in order to have a weight which is as low as possible. On the other hand, the rotor is solidly constructed in order to be able to withstand the pressure stresses and temperature stresses during operation of the axial turbomachine. The rotor blades are less solidly constructed in comparison to the rotor and are mounted on the rotor.

During operation of the axial turbomachine, the inner side of the casing and the rotor blades are in contact with hot gas, the casing having extensive contact with the hot gas on its inner side. Due to the fact that the casing is of a more filigree design than the rotor, the rotor heats up more slowly than the casing. This has the result that for startup and shutdown of the axial turbomachine the rotor and the casing have different rates of thermal expansion so that during startup and shutdown of the axial turbomachine the height of the radial gap, which is formed between the blade tips of the rotor blades and the inner side of the casing, changes. In this case, the radial gap is large during startup and small during shutdown. So that during shutdown the blade tips of the rotor blades do not butt against the casing and become damaged, the radial gap is provided with a minimum height which is dimensioned in such a way that during shutdown of the axial turbomachine the blade tips seldom, if ever, come into contact with the casing. This has the result that provision is made for a correspondingly dimensioned radial gap at the blade tips. On the other hand, especially during startup of the axial turbomachine, the radial gap is to be formed only large enough for a reduction of the power density and the efficiency of the axial turbomachine, brought about by the leakage flow, to be kept within acceptable limits.

Modern rotor blades have a very high aerodynamic efficiency which is achieved as a result of a high pressure load of the rotor blades. Brought about by this high pressure load, the leakage flow through the radial gap is particularly high so that as a result of the leakage flow the overall efficiency of the rotor blade is seriously impaired. Particularly in the case of rotor blades with small overall height and large radial gaps, about 50% of the overall loss of the rotor blades is caused by the leakage flow. A reduction of the leakage flow brings about an improvement of the overall efficiency of the rotor blade.

It is customarily known to reduce the leakage flow for example by means of an "active-clearance control" device. With the "active-clearance control" device, the casing is cooled during startup and heated up during shutdown so that the rate of thermal expansion of the casing is adapted to that of the rotor blades. Furthermore, for reducing the leakage flow a special profiling of the blade tips, such as the forming of a knife-blade-like blade tip, is known from U.S. Pat. No. 4,738,586.

A further blade tip, which is contoured in the direction of the span of the rotor blade, is known from EP 675 290 A2. The blade tip and the oppositely disposed passage wall are contoured corresponding to each other, the passage wall having an encompassing recess and the blade tip having a radial tip extension conforming to the recess. As a result of this measure, a quick reduction of the gas velocity in the region of the recess can be achieved, as a result of which the strength of shock waves is weakened.

A further blade-tip contouring and passage-wall contouring is gathered from FR 996967.

SUMMARY OF INVENTION

It is the object of the invention to create an axial turbomachine which has high aerodynamic efficiency. A further object of the invention is the provision of a rotor blade for it.

The axial turbomachine according to the invention has a rotor blade cascade according to the features of the claims. In this case, the rotor blades of the rotor blade cascade are formed according to the features of the claims.

The profiling of the rotor blade of the axial turbomachine according to the invention can be of a conventional type. The radial projections of the rotor blade extend parallel to the radial recess of the annulus inner side in the principal throughflow direction of the axial turbomachine so that the radial gap has a uniform and wave-like progression. The annulus inner side and blade airfoil tip—and correspondingly also the radial gap—which are formed in the style of a double wave, comprise in each case at least four curvature sections which are delimited by inflection points, wherein the curvatures of adjacent curvature sections have different signs. As a result, the leakage flow which ensues through the radial gap during operation of the axial turbomachine is accelerated and decelerated alternately.

As a result of the acceleration and deceleration, the throughflow velocity and the direction of the leakage flow is altered so that a gap vortex, which is formed during mixing of the leakage flow with the principal flow, is prevented in the initiation phase and in propagation. Consequently, the effect of the flow through the rotor blade cascade being homogenous and low in loss is advantageously achieved, as a result of which the efficiency of the rotor blade cascade, and therefore of the axial turbomachine, is high.

The gap, which is constant in its size, has a uniform, non-abruptly changing progression along the principal flow direction so that the flow in the region of the blade tip is low in loss.

Brought about by the reduced influence of the leakage flow upon the principal flow, in addition the work conversion of the rotor is high and the incident flow of a stator blade which lies downstream of the rotor blade is improved. As a result, a misaligned incident flow of this stator blade is reduced and/or the stator blade can have a simpler shape.

The mass flow of the leakage flow and its unfavorable effect upon the overall efficiency of the rotor blade cascade are advantageously reduced. As a result, an improved aerodynamic quality of the rotor blade cascade ensues without having to provide additional constructional measures.

In this case, the radial distance of the radial recess from the contours of the blade tips along the principal flow direction of the axial turbomachine is constant.

Furthermore, it is preferred that the first curvature section is located in that region of the annulus inner side which lies opposite the region of a front half of the profile chord of the blade airfoil tip, as seen from the leading edge. Moreover, it is preferred that the maximum of the first radial recess is located in that region or at that point which lies opposite at 10% to 30%, preferably at 20%, of the profile chord, as seen from the leading edge.

Therefore, the radial projection and the radial recess are advantageously located in the region of the highest pressure load of the blade tip of the conventionally profiled rotor blade so that the leakage flow through the radial gap is reduced.

Furthermore, it is preferred that the curvature sections are formed in such a way that in the principal throughflow direction of the axial turbomachine the progression of the radial gap extends essentially in an edge-free and step-free manner. In this case, provision can be made for even more than four curvature sections both in the annulus inner side and at the blade airfoil tip in order to reduce the leakage flow through the radial gap.

It is preferred that upstream of the first curvature section, downstream of the fourth curvature section and/or downstream of a curvature section adjoining it, provision is made for an additional section on the annulus inner side or at the blade airfoil tip, the progression of which is straight in the principal flow direction of the axial turbomachine.

Alternatively, it is preferred that the additional section, or the additional sections, is or are conical in the principal throughflow direction of the axial turbomachine.

As a result, a gentle transition from the radial recess or from the radial projections downstream to the trailing edge of the rotor blade is achieved so that the flow in the region of the blade tip is low in loss.

It is preferred that the first inflection point, as seen in the principal flow direction of the axial turbomachine and from the leading edge, is located at 5% to 15%, preferably at 10%, of the chord length of the blade, and/or the base of the radial recess is located at 15% to 25%, preferably at 20%, of the chord length of the rotor blade.

In principle, the contour of the blade airfoil tip and that of the annulus inner side opposite it are constantly in conformance so that both contours are to be identically described. Therefore, the occurring advantages which apply to the axial turbomachine correspondingly also apply to a rotor blade.

The axial turbomachine is preferably a compressor in a stationary gas turbine, in an aero engine, in a process compressor, in a fan, in a blower, in a steam pressure turbine, in a hydraulic turbine and/or in a pump.

BRIEF DESCRIPTION OF THE DRAWINGS

The invention is explained in the following text, based on a preferred embodiment of an axial compressor according to the invention with reference to the attached schematic drawings. In the drawing:

FIG. 3 shows a side view of the first embodiment of a casing of the axial compressor according to the invention.

DETAILED DESCRIPTION OF INVENTION

Figure 1:
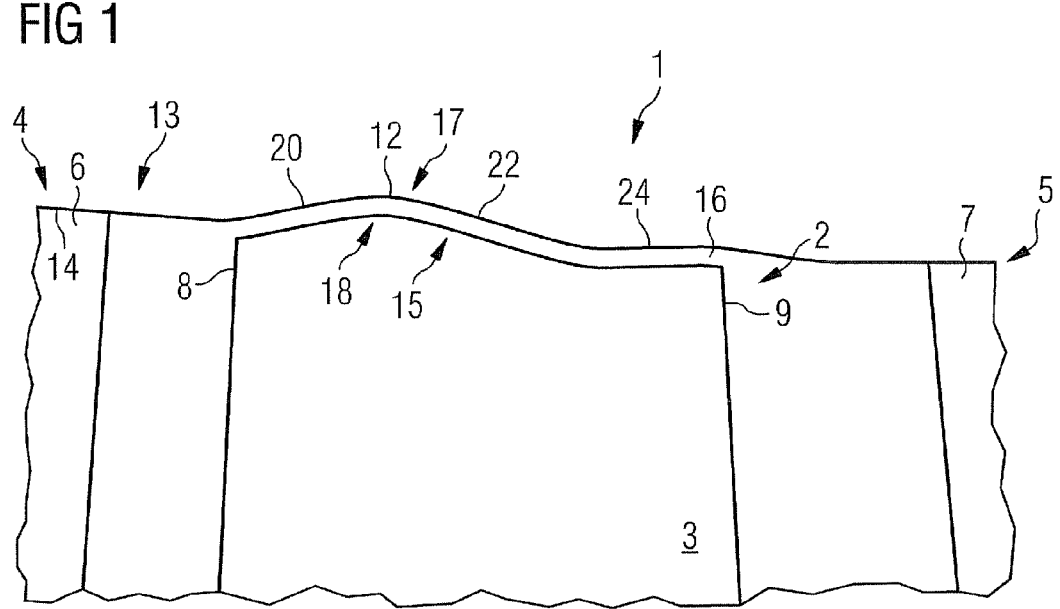
FIG. 1 shows a side view of a casing section of a first embodiment of the axial compressor according to the invention.
Figure 2:
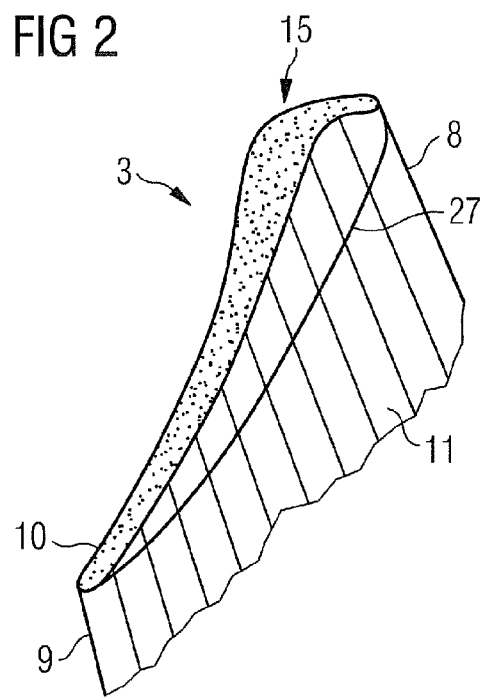
FIG. 2 shows a perspective view of a rotor blade tip of the embodiment from FIG. 1

As is apparent from FIGS. 1 to 3, an axial compressor 1 has a rotor 2 which has a rotor blade cascade which is formed from a multiplicity of rotor blades 3. The axial compressor 1 is exposed to throughflow from left to right, as seen in FIGS. 1 and 3.

Furthermore, the axial compressor 1 has a first stator 4 upstream of the rotor blade 3 and a second stator 5 downstream of the rotor blade 3. The first stator 4 is formed from a multiplicity of first stator blades 6 and the second stator 5 is formed from a multiplicity of second stator blades 7.

The rotor blade 3 has a leading edge 8 on its end facing upstream and a trailing edge 9 on its end facing downstream, wherein the one side between the leading edge 8 and the trailing edge 9 is the pressure side 10 and the other side between the leading edge 8 and the trailing edge 9 is the suction side 11 of the rotor blade 3. A rectilinear profile chord, with a standard chord length of 100%, extends from the leading edge 8 to the trailing edge 9, wherein the starting point, equating to 0% of the chord length of the profile chord, is located at the leading edge and the end point, equating to 100% of the chord length of the profile chord, is located at the trailing edge.

The rotor blade 3 is enclosed radially on the outside by an annulus wall 13, the annulus wall 13 having an annulus inner side 14 which faces the rotor blade 3. The rotor blade 3 is fastened by its radially inner longitudinal end and is free-standing by its radially outer longitudinal end, a blade tip 15 being formed at the freestanding end. A gap 16 is provided between the annulus inner side 14 and the blade tip 15.

The blade tip 15, on its side facing the annulus inner side 14, is provided with a radial projection 18, the maximum radial extent of which is located at 20% of the chord length of the profile chord of the blade 3. Following the progression of the blade tip 15, in a section of the annulus inner side 14 which lies opposite the blade tip 15, provision is made in the annulus wall 13 on the annulus inner side 14 for a radial recess 17 which, as seen in FIGS. 1 and 3, extends from left to right parallel to the radial projection 18. The radial recess 17 has a base 12 which is arranged radially on the outside level with the maximum radial extent of the radial projection 18.

The radial recess 17 is formed in an encompassing manner in the annulus wall 13. Consequently, when the rotor 2 rotates around the rotational axis 28, each rotor blade 3 can rotate with its radial projection 18 engaging in the radial recess 17.

As seen in the principal flow direction of the axial compressor 1, the radial recess 17 and, similarly to it, the radial projection 18, are formed according to a first embodiment from four curvature sections 19, 21, 23, 25, wherein the curvature sections 19, 21, 23, 25 in each case have a curvature, the sign of the curvatures changing from curvature section to curvature section. The curvature sections 19, 21, 23, 25 are arranged in series, wherein the first curvature section 19 is delimited from the second curvature section 21 by a first inflection point 20. Furthermore, the second curvature section 22 is separated from the third curvature section 23 by a second inflection point 22. The third curvature section 23 is delimited from the fourth curvature section 25 by a third inflection point 24. As a result of the series-arrangement of the curvature sections 19, 21, 23, 25 and the inflection points 20, 22, 24 lying in between, the gap 16 between the blade tip 15 and the annulus inner side 14 is of a wave-like form.

In FIG. 2, the radial limit of a conventional blade tip is shown by the line 27 so that the radial length extension is noticeably brought about by the provision of the radial projection 18.

In FIG. 3, the progression of the annulus inner side 14 in relation to a rotational axis 28 of the axial compressor 1 according to the first embodiment is shown. Upstream of the first curvature section 19 and/or downstream of the fourth curvature section 25, the progression of the annulus inner side 14, at least in that region which lies opposite the blade airfoil tip 15, is conical and therefore rectilinear, in order to maintain a passage contraction.

Naturally, it is possible that the progression of the annulus inner side 14 and correspondingly the blade airfoil tip 15 do not have only four curvature sections but even more curvature sections.

The invention claimed is:

1. An axial turbomachine including a rotor blade cascade, comprising:
   a plurality of rotor blades each having a leading edge and a radially outer, freestanding blade tip; and
   an annulus wall, encasing the rotor blade cascade, with an annulus inner side by which the annulus wall is arranged directly adjacently to the blade tips, forming a radial gap between the contours of the blade tips and the annulus inner side,
   wherein inside an axial section of the annulus inner side lying opposite the blade tip, the annulus wall, on the annulus inner side, has at least one encompassing first radial recess, with a first and a second curvature section, which along a principal throughflow direction of the axial turbomachine is arranged at a constant radial distance from the contours of the blade tips which correspond to the annulus inner side,
   wherein in the principal throughflow direction of the axial turbomachine the progression on the annulus inner side has at least a third curvature section adjoining the second curvature section and a fourth curvature section adjoining the third curvature section,
   wherein the first curvature section is delimited from the second curvature section by a first inflection point,
   wherein the second curvature section is delimited from the third curvature section by a second inflection point,
   wherein the third curvature section is delimited from the fourth curvature section by a third inflection point, and
   wherein the curvatures of adjacent curvature sections have different signs.

2. The axial turbomachine as claimed in claim 1, wherein the first curvature section is located in a first region of the annulus inner side which lies opposite a second region of a front half of a profile chord of the blade tip, as seen from the leading edge.

3. The axial turbomachine as claimed in claim 1, wherein a maximum of the first radial recess is located in a third region or at a first point which lies opposite at 10% to 30% of the profile chord, as seen from the leading edge.

4. The axial turbomachine as claimed in claim 3, wherein the maximum of the first radial recess is located at the first point which lies opposite at 20% of the profile chord, as seen from the leading edge.

5. The axial turbomachine as claimed in claim 1, wherein the first, second, third, and fourth curvature sections are formed in such a way that along the principal throughflow direction of the axial turbomachine a first progression of the radial gap extends essentially in an edge-free and step-free manner.

6. The axial turbomachine as claimed in claim 1, wherein in the principal throughflow direction of the axial turbomachine a second progression on the annulus inner side includes additional curvature sections adjoining the fourth curvature section.

7. The axial turbomachine as claimed in claim 1, wherein upstream of the first curvature section, downstream of the fourth curvature section and/or downstream of an additional curvature section adjoining the fourth curvature section, provision is made for an additional section of the annulus inner side, a third progression of which is straight in the principal flow direction of the axial turbomachine.

8. The axial turbomachine as claimed in claim 7, wherein the additional section is conical.

9. The axial turbomachine as claimed in claim 5, wherein as seen in the principal throughflow direction of the axial turbomachine and from a second point lying opposite the leading edge of the rotor blade, the first inflection point is located at 5% to 15%, of the chord length of the rotor blade, and/or a base of the first radial recess is located at 15% to 25%, of a chord length of the rotor blade.

10. The axial turbomachine as claimed in claim 9, wherein the first inflection point is located at 10% of the chord length of the rotor blade.

11. The axial turbomachine as claimed in claim 9, wherein the base of the first radial recess is located at 20% of the chord length of the rotor blade.

12. A rotor blade for an axial turbomachine, comprising:
    a leading edge; and
    a radially outer, freestanding blade tip,
    wherein at least one first radial projection with a first curvature section and a second curvature section are disposed at the blade tip,
    wherein along a profile chord of the rotor blade, the blade tip includes a third curvature section adjoining the second curvature section and a fourth curvature section adjoining the third curvature section,
    wherein the first curvature section is delimited from the second curvature section by a first inflection point,
    wherein the second curvature section is delimited from the third curvature section by a second inflection point,
    wherein the third curvature section is delimited from the fourth curvature section by a third inflection point, and
    wherein the curvatures of adjacent curvature sections have different signs.

13. The rotor blade as claimed in claim 12, wherein the first radial projection is located in a region of a front half of a chord length.

14. The rotor blade as claimed in claim 12, wherein a maximum of the first radial projection is located at 10% to 30%, of the profile chord, as seen from the leading edge.

15. The rotor blade as claimed in claim 12, wherein the maximum of the first radial projection is located at 20%, of the profile chord, as seen from the leading edge.

* * * * *